(12) United States Patent
Shu et al.

(10) Patent No.: US 8,584,592 B1
(45) Date of Patent: Nov. 19, 2013

(54) GUIDING DEVICE

(71) Applicant: National Tsing Hua Unviersity, Hsin Chu (TW)

(72) Inventors: Kuan-Lwun Shu, Taichung (TW); Long-Iong Wu, Hsin Chu (TW)

(73) Assignee: National Tsing Hua University, Hsin Chu (TW)

( * ) Notice: Subject to any disclaimer, the term of this patent is extended or adjusted under 35 U.S.C. 154(b) by 0 days.

(21) Appl. No.: 13/732,013

(22) Filed: Dec. 31, 2012

(30) Foreign Application Priority Data

Aug. 28, 2012 (TW) ............................. 101131254 A

(51) Int. Cl.
*E01B 25/22* (2006.01)
(52) U.S. Cl.
USPC .......................................... 104/106; 104/118
(58) Field of Classification Search
USPC .................. 104/106–111, 118–121; 384/45
See application file for complete search history.

(56) References Cited

U.S. PATENT DOCUMENTS

| | | | | |
|---|---|---|---|---|
| 4,296,974 A * | 10/1981 | Teramachi | | 384/45 |
| 5,108,197 A * | 4/1992 | Morita | | 384/45 |
| 5,308,170 A * | 5/1994 | Yamaguchi et al. | | 384/45 |
| 5,411,334 A * | 5/1995 | Takei et al. | | 384/45 |
| 5,735,214 A * | 4/1998 | Tsuboi | | 105/29.1 |
| 6,042,269 A * | 3/2000 | Konomoto | | 384/45 |
| 6,338,573 B1 * | 1/2002 | Michioka et al. | | 384/45 |
| 6,488,411 B2 * | 12/2002 | Michioka et al. | | 384/45 |
| 2002/0028030 A1 * | 3/2002 | Michioka et al. | | 384/45 |
| 2009/0154850 A1 * | 6/2009 | Michioka et al. | | 384/54 |
| 2010/0005998 A1 * | 1/2010 | Kempf | | 105/150 |
| 2010/0150483 A1 * | 6/2010 | Aida et al. | | 384/45 |
| 2010/0183252 A1 * | 7/2010 | Lin et al. | | 384/45 |
| 2010/0209027 A1 * | 8/2010 | Pfister et al. | | 384/13 |
| 2010/0209029 A1 * | 8/2010 | Pfister et al. | | 384/45 |
| 2011/0033141 A1 * | 2/2011 | Chen et al. | | 384/45 |
| 2011/0058758 A1 * | 3/2011 | Menges et al. | | 384/45 |
| 2011/0110615 A1 * | 5/2011 | Kishi et al. | | 384/42 |

* cited by examiner

*Primary Examiner* — Jason C Smith
(74) *Attorney, Agent, or Firm* — Muncy, Geissler, Olds & Lowe, PLLC

(57) ABSTRACT

A guiding device includes a straight track, an arc track, and an interconnecting track joining the former two, where the interconnecting track has two opposite rolling contact surfaces, one with the profile being identical to that of the arc track and the other with a variable-curvatured profile. Only two rolling members are provided to roll on the side of the arc profile and only one rolling member is provided to roll on the side of the variable-curvatured profile, achieving a result that the rolling members driving a movement of a moving body remain contact with corresponding tracks in their rolling motion so as to improve stability and smooth transition of the device in motion.

7 Claims, 10 Drawing Sheets

GUIDING DEVICE

FIELD OF THE INVENTION

The invention is relevant to a guiding device, especially to a guiding device allowing for a transition from a straight section to an arc section of a moving body in a non-gap way relative to a track, resulting in a high precision on guiding motion.

DESCRIPTION OF THE PRIOR ART

Rail guiding technique is widely used and associating apparatus has been seen in various industrial application very often, from rail vehicle such as electronic trains in transport system to automatic conveying device for materials in a plant, especially for materials such as semiconductor device or panel in high technologic field, and as well as non-conveying application such as mechanical positioning or sliding stage for measuring instrument.

Nowadays a mature development of linear guiding system is achieved and various improvement has been proposed by manufacturers. However, in practice there is a need for changing direction of workpiece guided due to limited working space or arrangement of multi-station processing apparatus. Two of conventional solutions to changing guiding direction are demonstrated below.

The first conventional configuration features addition of turnable tables located where direction change occurs. When the workpiece reaches where the turnable is located, direction of the workpiece is changed through the turning motion of the turnable table and the workpiece is subsequently guided by next track section. In the guiding device above, only straight track sections are required, however a disadvantage exists that cost of overall configuration and complexity on assembling work rises due to increasing required components such as turnable tables. Further, process efficiency is apt to drop down for requirement on workpiece waiting for direction switching.

Referring to FIG. 1, there is another conventional guiding device, as disclosed in US patent application of publication No. 2002/028030, in which a straight track 91 and an arc track 92 are connected to each other directly and the straight track 91 has straight rolling surfaces 911 and 912 on opposite sides for rollers rolling on and likewise the arc track 92 has arc rolling surfaces 921 and 922 on its opposite sides. A moving body 93 includes plural balls 94 inside arranged in two rows and several columns. Here the term "row" is referred to as a measuring unit of arrangement along the height of a track, while "column" along the longitudinal direction of the track.

All of the balls 94 generally contact with corresponding rolling surface 911, 912, 921, and 922 simultaneously and move along straight and arc tracks. For such guiding device, clearance is needed between the balls 94 and the tracks during transition between different tracks, otherwise a portion of the balls may interfere with the rolling surface of the straight track 91 as soon as the moving body 93 moves from the straight track 91 to the arc track 92, resulting in noise problem. Therefore, in the patent publication a suggestion is made that the arc track is better narrower than the straight track.

On the other hand, existence of the clearance causes a portion of the balls inside the moving body to lose contact with the rolling surface of the arc track, leading to an inaccurate guiding path. In addition, it is obvious that the guiding device has different load capacity at the straight section than at the arc section, that is, lower capacity occurs at the arc section. Thus load capacity at the arc is usually considered as priority for safety concern, which causes redundancy of load capacity at straight section. Moreover, a special and complicated circulating path for the balls is also designed in the guiding device above.

Given the above, conventional guiding device is unable to integrate advantages of guiding effectiveness, noise elimination, guiding precision, and simplicity in whole configuration.

SUMMARY OF THE INVENTION

One objective of the present invention is to resolve problems that inaccurate guiding, impact noise and varying load capacity due to clearance between the balls and the track which exist in prior art.

Another objective of the present invention is to provide a guiding device with minimum number of rolling members to fulfill simplified assembling requirement and reduced component cost.

To achieve the objectives above and others, a guiding device of the invention comprises a track assembly, a moving body, and a rolling unit, wherein the moving body spans the track assembly. The track assembly includes a straight track, an interconnecting track, and an arc track, which are connected in sequence, where the straight track has a first straight contact surface and a second straight contact surface on opposite sides, the arc track has concentric first and second arc contact surfaces on opposite sides, and the interconnecting track has a third arc contact surface and a variable-curvatured contact surface on opposite sides.

The third arc contact surface of the interconnecting track and the first arc contact surface of the arc track are the same in curvature. The third arc contact surface links the first straight contact surface and the first arc contact surface, while the variable-curvatured contact surface links the second straight contact surface and the second arc contact surface.

The rolling unit is composed of a first rolling member, a second rolling member, and a third rolling member, by which the moving body is able to move along the track assembly. The first and second rolling members normally roll and couple between the moving body and the track assembly on a side where the third arc contact surface is located, while the third rolling member normally rolls and couples between the moving body and the track assembly on a side where the variable-curvatured contact surface is located.

Through the device of the present invention, only three (columns of, more precisely) rolling members are needed and thus contact condition with corresponding tracks is maintained without impact noise. The present invention allows an object conveyed to change moving direction smoothly, and it is advantageous especially in the case that high precision guiding and high stability are needed.

The present invention also has merits in that the rolling member is not limited, for example, it can be form of a ball or of a roller with V-groove, and any other equivalent member is applicable to the design of the present invent.

The present invention can be applied to all kinds of guiding motion and thus relates to track type transportation, track type entertainment facility/apparatus, industrial material conveying equipment, measuring or positioning purpose sliding stage.

The rolling member in the form of a roller with annular V-groove may be provided to connect with the moving body by a pivotal post around which the roller is allowed to perform a pure rolling motion. In the case, each contact surface of each track is formed to be a horizontally-orientated cone portion engaging with the annular groove of the roller so as to avoid undesired movement of the roller.

The rolling member in the form of a ball may be provided with all balls being restrained in a space defined between the moving body and the track assembly and performing pure rolling motion, thereby the moving body is able to move along the track assembly as well.

Considering that only one single rolling member bears load on the variable-curvatured contact surface side, it is preferable to provide the third rolling member with greater radii than the first and second rolling members.

In an example, profile of the variable-curvatured contact surface may be expressed as follows:

$$X_P = R_1\cos\theta - \sqrt{4\left(L\sin\frac{\eta}{2}\right)^2 - [R_1(1-\sin\theta)]^2} + L\cos\left(\phi + \frac{\pi}{2} - \frac{\eta}{2}\right) - r_2\cos\theta_C$$

$$Y_P = -R_1 + L\sin\left(\phi + \frac{\pi}{2} - \frac{\eta}{2}\right) - r_2\sin\theta_C$$

$$\phi = \tan^{-1}\left(\frac{Y_B - Y_A}{X_B - X_A}\right) = \tan^{-1}\left(\frac{R_1(1-\sin\theta)}{\sqrt{4\left(L\sin\frac{\eta}{2}\right)^2 - [R_1(1-\sin\theta)]^2}}\right)$$

$$\theta_C = \tan^{-1}\left\{\frac{-\left(R_1\cos\theta - \sqrt{4\left(L\sin\frac{\eta}{2}\right)^2 - [R_1(1-\sin\theta)]^2}\right)\tan\theta + R_1 - L\sin\left(\phi + \frac{\pi}{2} - \frac{\eta}{2}\right)}{-L\cos\left(\phi + \frac{\pi}{2} - \frac{\eta}{2}\right)}\right\}$$

where the first rolling member and the second rolling member are the same in radii, an OXY coordinate system has an origin lying on a curvature center of the arc track, the OXY coordinate system has an X axis and a Y axis which are parallel with and perpendicular to the straight track respectively, θ is an angle formed from the positive X axis to a reference line which is a straight line connecting a center of the second rolling member and the origin O of the OXY coordinate system, $R_1$ is a sum of a curvature radii of the first arc contact surface and a radii of the first rolling member, $r_2$ is a radii of the third rolling member, L is a center distance between the first rolling member and the third rolling member (also a center distance between the second rolling member and the third rolling member), η is an angle formed by a line connecting centers of the first rolling member and the third rolling member and a line connecting centers of the second rolling member and the third rolling member.

BRIEF DESCRIPTION OF THE DRAWINGS

The primitive objectives and advantages of the present invention will become apparent upon reading the following description and upon reference to the accompanying drawings in which.

DESCRIPTION OF THE PREFERRED EMBODIMENT

Preferred embodiments and aspects of the invention will be described to explain the scope, structures and procedures of the invention. In addition to the preferred embodiments of the specification, the present invention can be widely applied in other embodiments.

The invention proposes that an interconnecting track of non-constant width is utilized to link a straight track and an arc track, where opposite rolling contact surfaces of the interconnecting track are designed to be the same profile as the arc linked and a variable-curvatured profile relevant to the arc profile respectively. Further, a concentration is also made on utilization of only three rolling members for normally rolling and coupling between the moving body and the corresponding track, carrying out a seamless configuration of the moving body with respect to the track assembly and a smooth transition of motion from straight path to arc path. The invention is never seen before and provides great improvement in terms of stability and accuracy of guiding motion.

Figure 1:
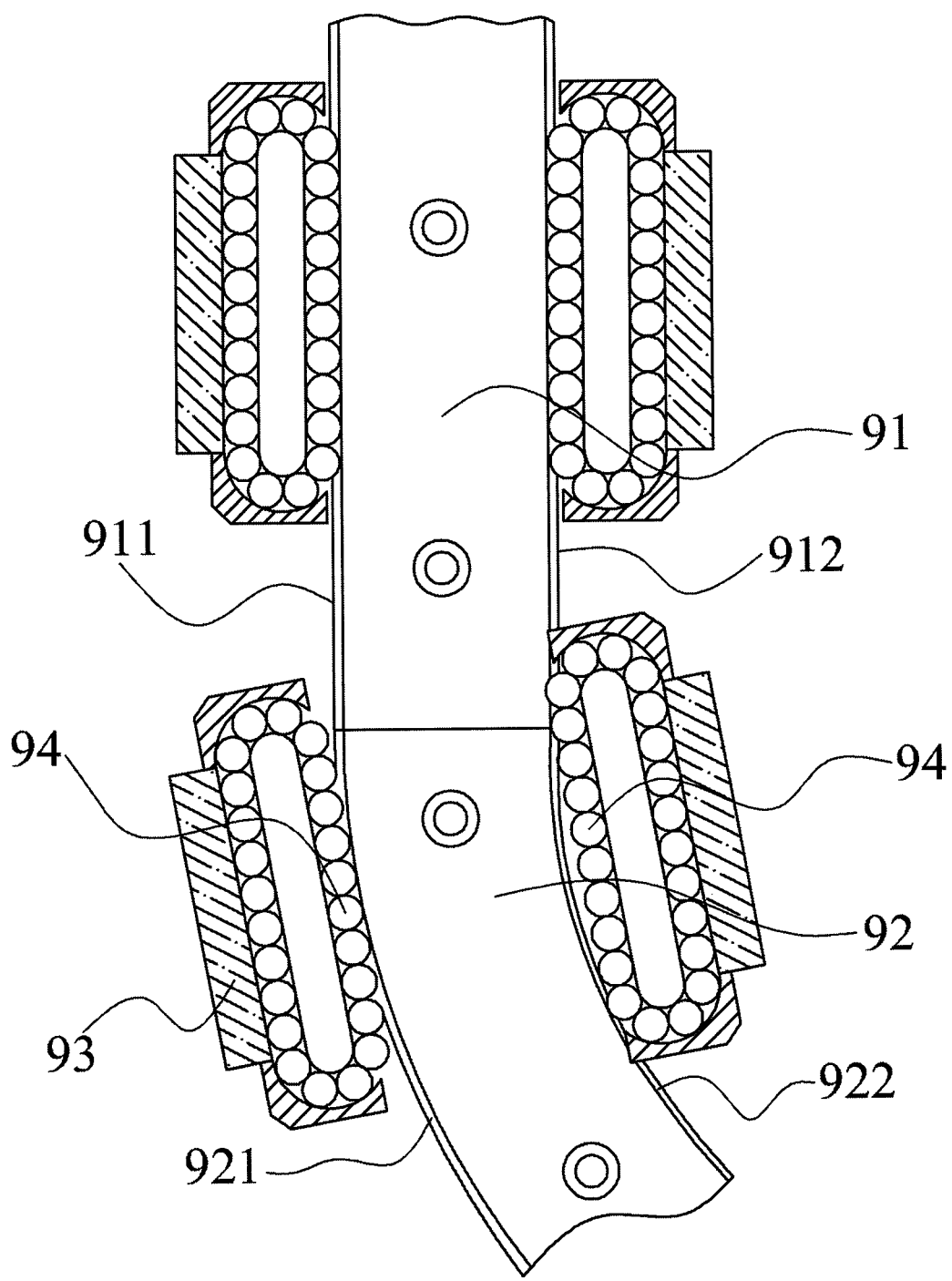
FIG. 1 shows a planar view of a conventional guiding device.
Figure 2:
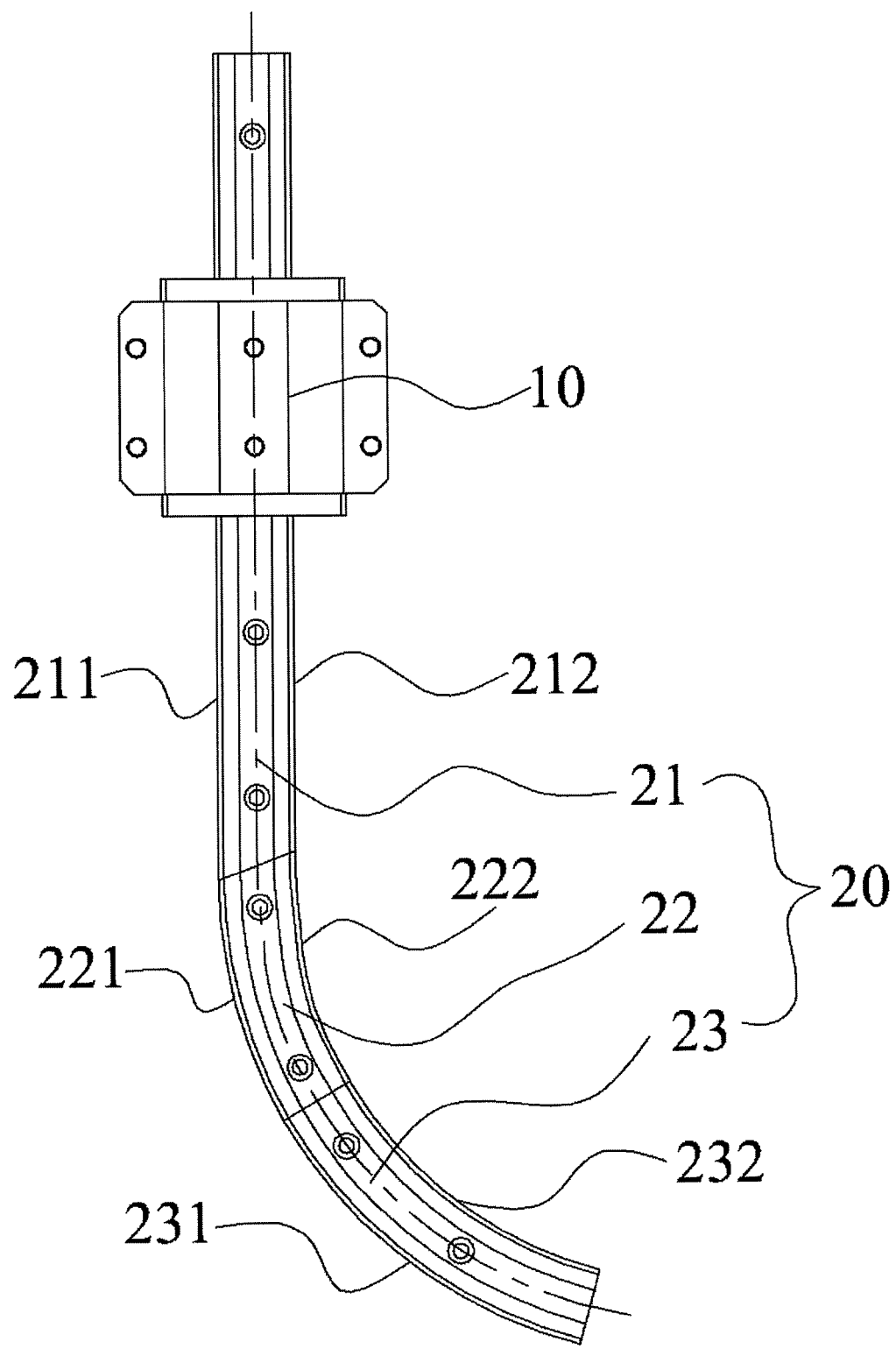
FIG. 2 shows a planar view of a guiding device according to an embodiment of the invention.
Figure 3:
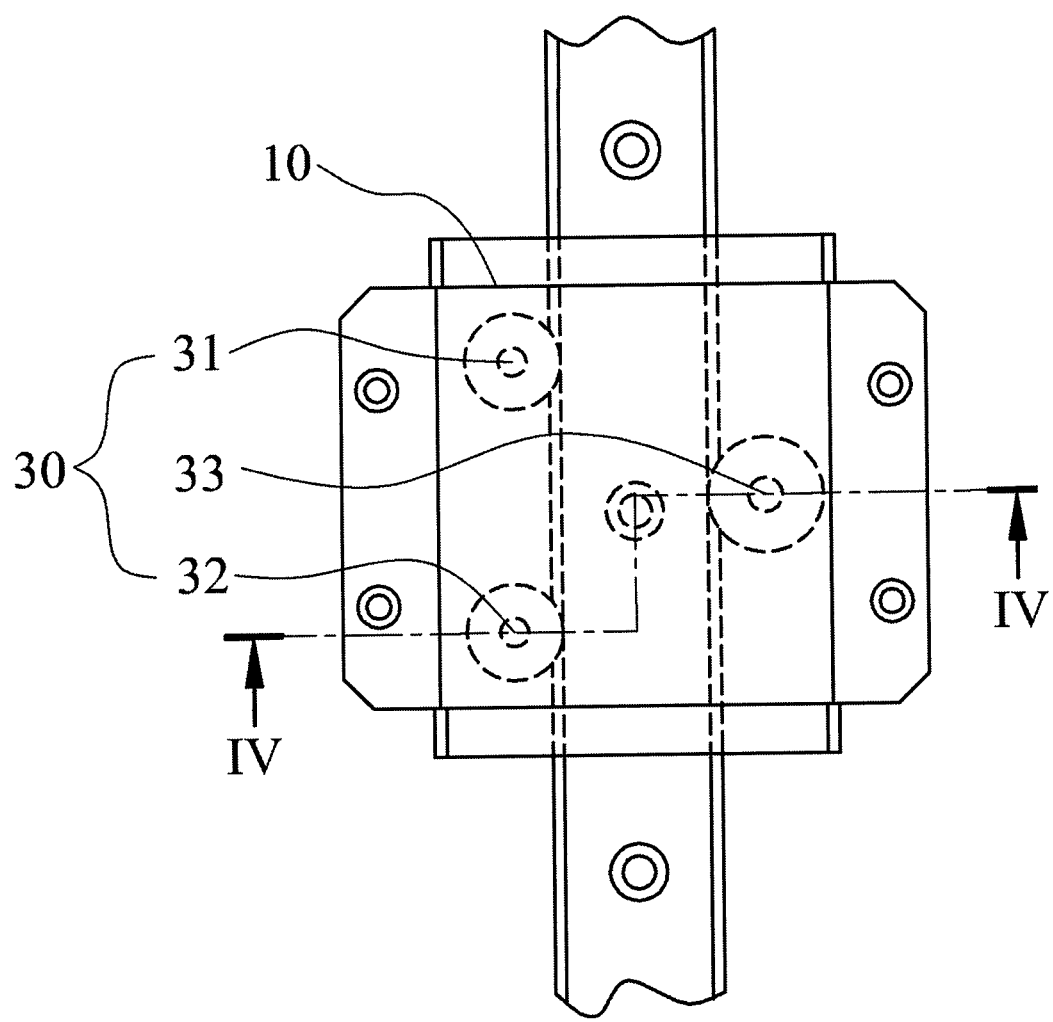
FIG. 3 is an enlarged view of a moving body in FIG. 2.
Figure 4:
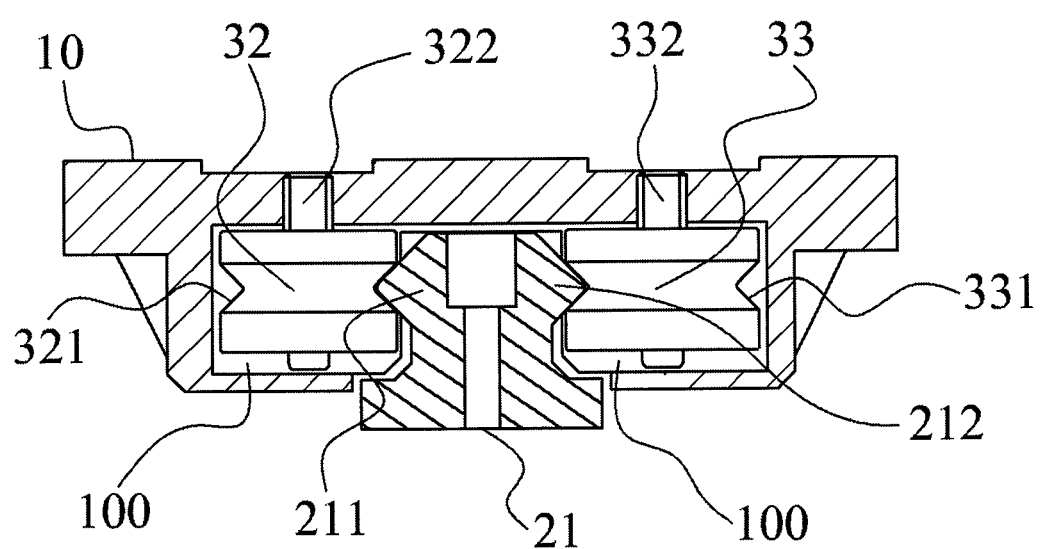
FIG. 4 is a sectional view taken along line IV-IV in FIG. 3.

Referring to FIGS. 2 through 4, illustrating a planar view of a guiding device according to an embodiment of the invention, an enlarged view of a moving body, and a sectional view taken along line IV-IV; the drawings show that the guiding device mainly includes a moving body 10, a track assembly 20, and a rolling unit 30 for moving the moving body 10 along the track assembly 20. The track assembly includes a straight track 21, an interconnecting track 22, and an arc track 23, and the three track sections 21, 22, and 23 of the track assembly 20 are so linked in listed sequence that the moving body 10 is allowed to have a smooth transition from a straight motion to an arc motion. The straight track 21 is made to link the interconnecting track 22 in tangential relation.

The straight track 21 includes a first straight contact surface 211 and a second straight contact surface 212 on opposite sides. The arc track 23 has first and second arc contact surfaces 231 and 232 on opposite sides, two of which are made concentric. The interconnecting track 22 has a third arc contact surface 221 and a variable-curvatured contact surface 222 on opposite sides.

The third arc contact surface 221 links the first straight contact surface 211 and the first arc contact surface 231 while the variable-curvatured contact surface 222 links the second straight contact surface 212 and the second arc contact surface 232.

In particular, the third arc contact surface 221 of the interconnecting track 22 has the same curvature as the first arc contact surface 231 of the arc track 23.

Material and producing method for the tracks are not limited, for example, aluminum is adopted as material in one embodiment.

The moving body 10 spans the track assembly 20 in the embodiment and has a channel section.

The rolling unit 30 is composed of a first rolling member 31, a second rolling member 32, and a third rolling member 33, and the moving body 10 is designed to move along the track assembly 20 through only the three rolling members 31, 32, and 33.

The first rolling member 31 and the second rolling member 32 normally roll and couple between the moving body 10 and the track assembly 20 on a side where the third arc contact surface 221 is located, and the third rolling member 33 normally rolls and couples between the moving body 10 and the track assembly 20 on a side where the variable-curvatured contact surface 222 is located. In the embodiment, the rolling members 31 to 33 are rollers, each with an annular groove (e.g. reference numbers 321 and 331 in FIG. 4), and are pivoted at the moving body 10 via pivotal posts (e.g. reference numbers 322 and 332), which are parallel with the height direction of the moving body 10. The rolling members 31, 32, and 33 are accommodated within an accommodating space 100 defined between the moving body 10 and the track assembly 20. The contact surfaces 211, 212, 221, 222, 231, and 232 each are formed to be a horizontally-orientated cone portion so that the rolling members 31 to 33 may be avoided from shaking up and down by engaging the annular groove with the horizontally-orientated cone portion.

A profile of the variable-curvatured contact surface 222 may be determined by a curvature radii of the first arc contact surface 231, radius of the first, second and third rolling member 31 to 33, distance between the first and the third rolling members 31 and 33, distance between the second and the third rolling members 32 and 33, as well as an angle formed by a line connecting centers of the first rolling member 31 and the third rolling member 33 and a line connecting centers of the second rolling member 32 and the third rolling member 33.

Figure 5:
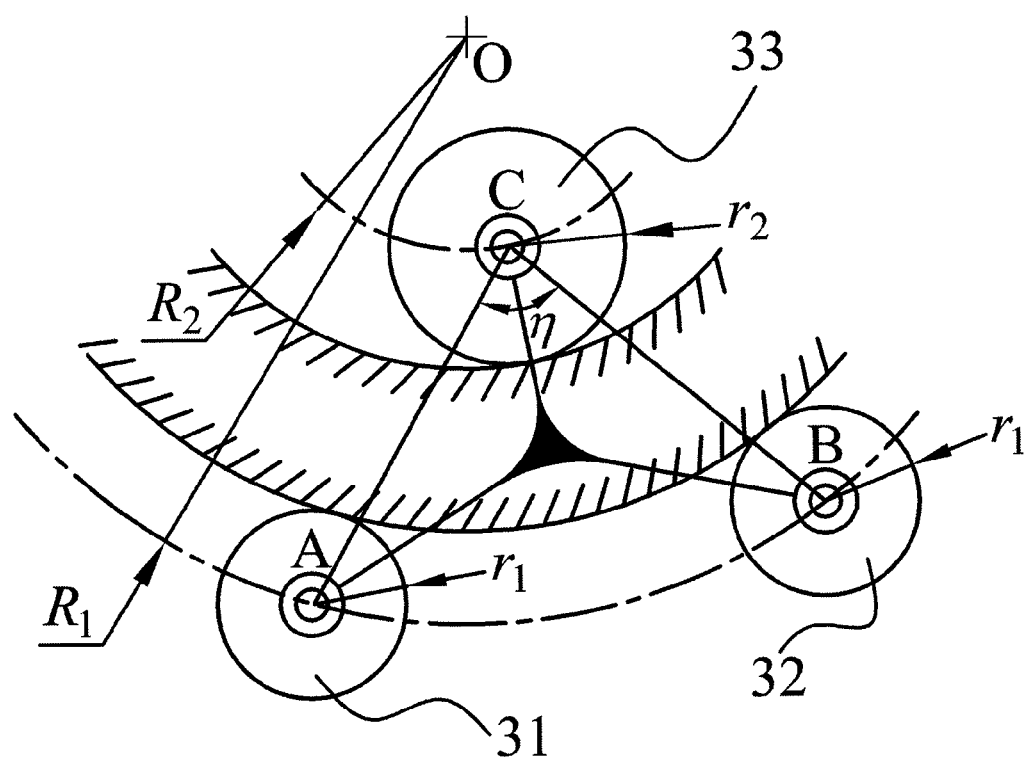
FIG. 5 is a schematic view for deriving profile of a variable-curvatured contact surface where all three rolling members travel on arc paths.
Figure 6:
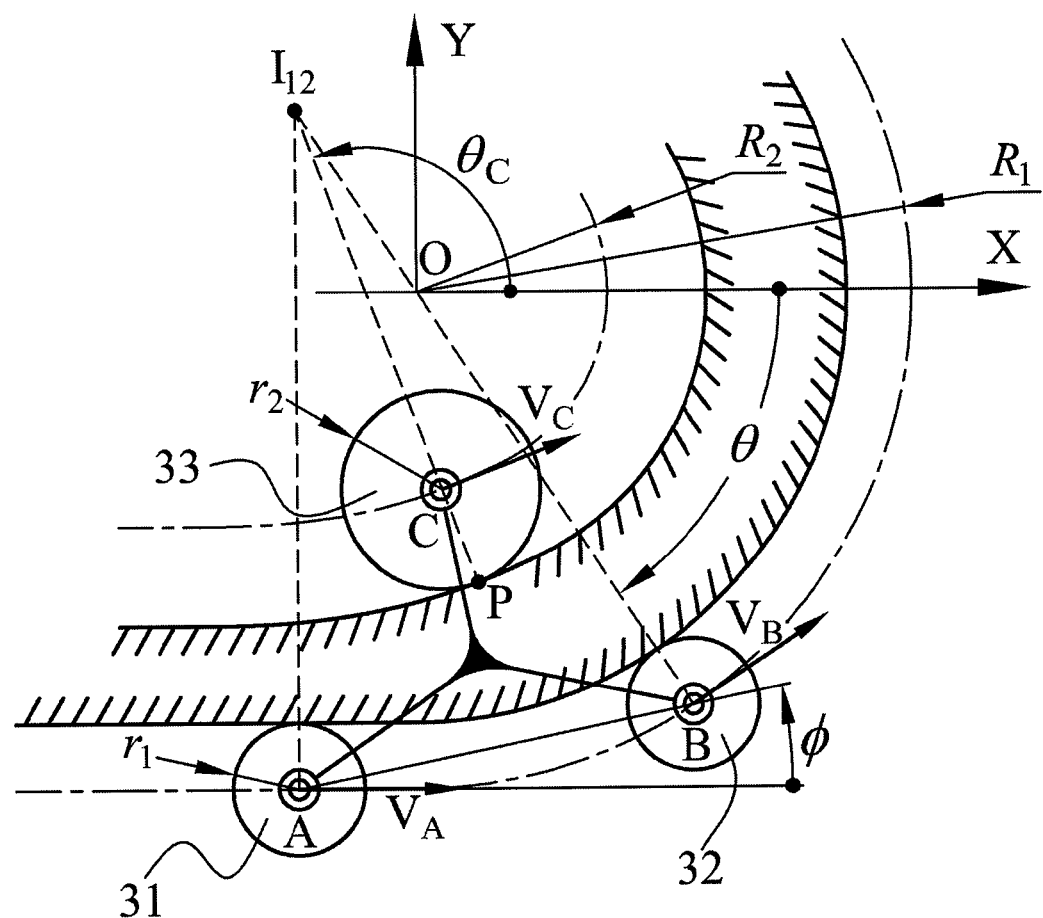
FIG. 6 is a schematic view for deriving profile of a variable-curvatured contact surface where three rolling members travel on paths of different types.

An example is taken to demonstrate derivation of the profile of the variable-curvatured contact surface from a planar perspective. Referring to FIGS. 5 and 6, the third rolling member 33 in the embodiment is positioned between the first rolling member 31 and the second rolling member 32 along a longitudinal direction of the track assembly. In the figures, it also shows a center A of the first rolling member 31, a center B of the second rolling member 32, and a center C of the third rolling member 33.

In the example, for purpose of convenient design, length of line AC equals to length of line BC and is denoted by L, line AC connecting centers of the first rolling member 31 and the third rolling member 33 and line BC connecting centers of the second rolling member 32 and the third rolling member 33 form an angle η, and radius of the first and the second rolling members are equal, denoted by $r_1$. Radii of the third rolling member 33, denoted by $r_2$, is preferably greater than $r_1$ for providing sufficient strength during rolling motion.

The pitch curve of the second rolling member 32, at the arc track section, has a radii $R_1$, equaling to a sum of a curvature radii of the first arc contact surface and a radii of the first rolling member. Since three members 31 to 33 maintain a constant relative arrangement within the moving body 10 due to rigid connection, motion of the third rolling member 33 can be specified.

According to equilateral triangles ABC and ABO shown in FIG. 5, a radii of the pitch curve of the third rolling member 33, denoted by $R_2$, can be expressed as follows:

$$R_2 = \sqrt{R_1^2 - \left(L\sin\frac{\eta}{2}\right)^2} - L\cos\frac{\eta}{2}$$

FIG. 6 shows that the first and the second rolling members 31 and 32 are located at different sections of the same pitch curve, that is a straight section and an arc section respectively. $V_A$, $V_B$, and $V_C$ represent respective velocity vectors of points A, B, and C.

Inverse kinematic analysis is used here to obtain a position expression $(X_C, Y_C)$ for center C of the third rolling member 33. First, an OXY coordinate system is set to locate its origin O at the center of the arc section of the pitch curve (also curvature center of the arc track) and its two coordinate axes X axis and Y axis are set to parallel with and perpendicular to the straight track.

Position coordinate expressions $(X_A, Y_A)$ and $(X_B, Y_B)$ for the centers A and B are as follows:

$$X_A = R_1\cos\theta - \sqrt{4\left(L\sin\frac{\eta}{2}\right)^2 - [R_1(1 - \sin\theta)]^2}$$

$$Y_A = -R_1$$

$$X_B = R_1 \cos\theta$$

$$Y_B = -R_1 \sin\theta$$

where θ denotes a measuring angle from positive X axis to a reference line OB.

Angular displacement φ of the rolling member 31(32), measured from a horizontal vector parallel with positive X axis, is expressed as follows:

$$\phi = \tan^{-1}\left(\frac{Y_B - Y_A}{X_B - X_A}\right) = \tan^{-1}\left(\frac{R_1(1 - \sin\theta)}{\sqrt{4\left(L\sin\frac{\eta}{2}\right)^2 - [R_1(1 - \sin\theta)]^2}}\right)$$

Position coordinate for the center C of the third rolling member 33 is expressed as follows:

$$X_C = X_A + L\cos\left(\phi + \frac{\pi}{2} - \frac{\eta}{2}\right)$$

$$Y_C = Y_A + L\sin\left(\phi + \frac{\pi}{2} - \frac{\eta}{2}\right)$$

According to conditions that the common normal for contact points of the track and the rolling member intersect in their instant center, and that perpendiculars to velocity vectors $V_A$ and $V_B$ of the first and the second rolling members 31 and 32 intersect in the instant center, position coordinate of the instant center for the track assembly and the rolling member is expressed as follows:

$$X_I = X_A$$

$$Y_I = -X_A \tan\theta$$

Then the common normal of the third rolling member 33 and the track assembly can be obtained, an angle measured from positive X axis to line connecting point C and the instant center ($CI_{12}$), $$\theta_C = \tan^{-1}\left(\frac{Y_I - Y_C}{X_I - X_C}\right).$$

Lastly, position coordinate expression for profile of the track assembly traced by the third rolling member 33 is:

$$X_P = X_C - r_2 \cos\theta_c$$

$$Y_P = Y_C - r_2 \cos\theta_c$$

Expression for $(X_P, Y_P)$ can be rewritten as follows:

$$X_P =$$

$$R_1\cos\theta - \sqrt{4\left(L\sin\frac{\eta}{2}\right)^2 - [R_1(1-\sin\theta)]^2} + L\cos\left(\phi + \frac{\pi}{2} - \frac{\eta}{2}\right) - r_2\cos\theta_C$$

$$Y_P = -R_1 + L\sin\left(\phi + \frac{\pi}{2} - \frac{\eta}{2}\right) - r_2\sin\theta_C$$

$$\phi = \tan^{-1}\left(\frac{Y_B - Y_A}{X_B - X_A}\right) = \tan^{-1}\left(\frac{R_1(1-\sin\theta)}{\sqrt{4\left(L\sin\frac{\eta}{2}\right)^2 - [R_1(1-\sin\theta)]^2}}\right)$$

$$\theta_C = \tan^{-1}\left\{\frac{-\left(R_1\cos\theta - \sqrt{4\left(L\sin\frac{\eta}{2}\right)^2 - [R_1(1-\sin\theta)]^2}\right)\tan\theta + R_1 - L\sin\left(\phi + \frac{\pi}{2} - \frac{\eta}{2}\right)}{-L\cos\left(\phi + \frac{\pi}{2} - \frac{\eta}{2}\right)}\right\}$$

Figure 7:
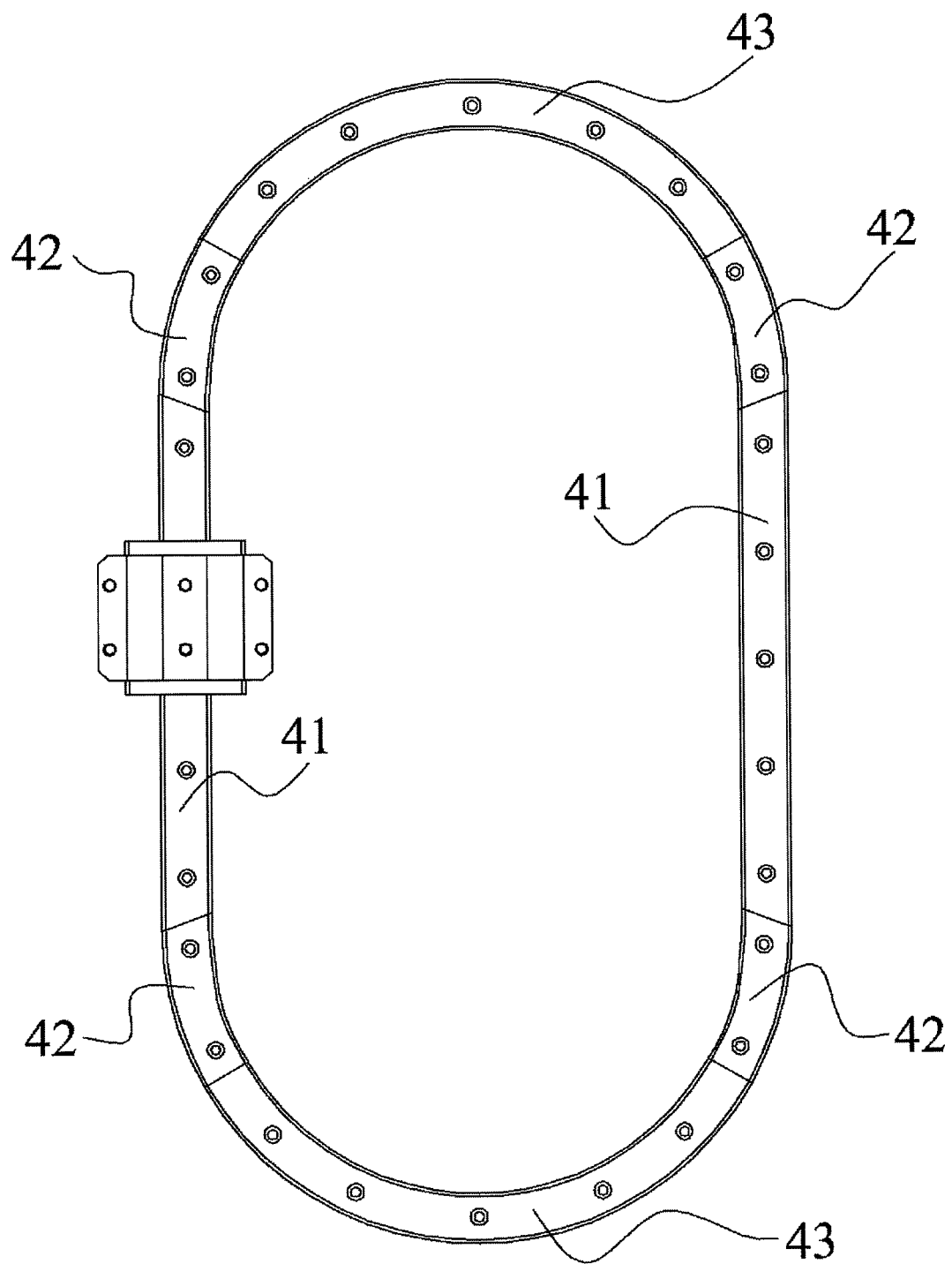
FIG. 7 illustrates a first example of application of the guiding device according to the present invention.

In practice, the moving body can serve as a support for conveying articles, as shown in FIG. 7. For such a complete guiding system, a criteria that an interconnecting track links a straight track and an arc track is followed, and specifically, two straight tracks 41, four interconnecting tracks 42, and two arc tracks 43 are assembled to form a track structure with closed guiding path.

Figure 8:
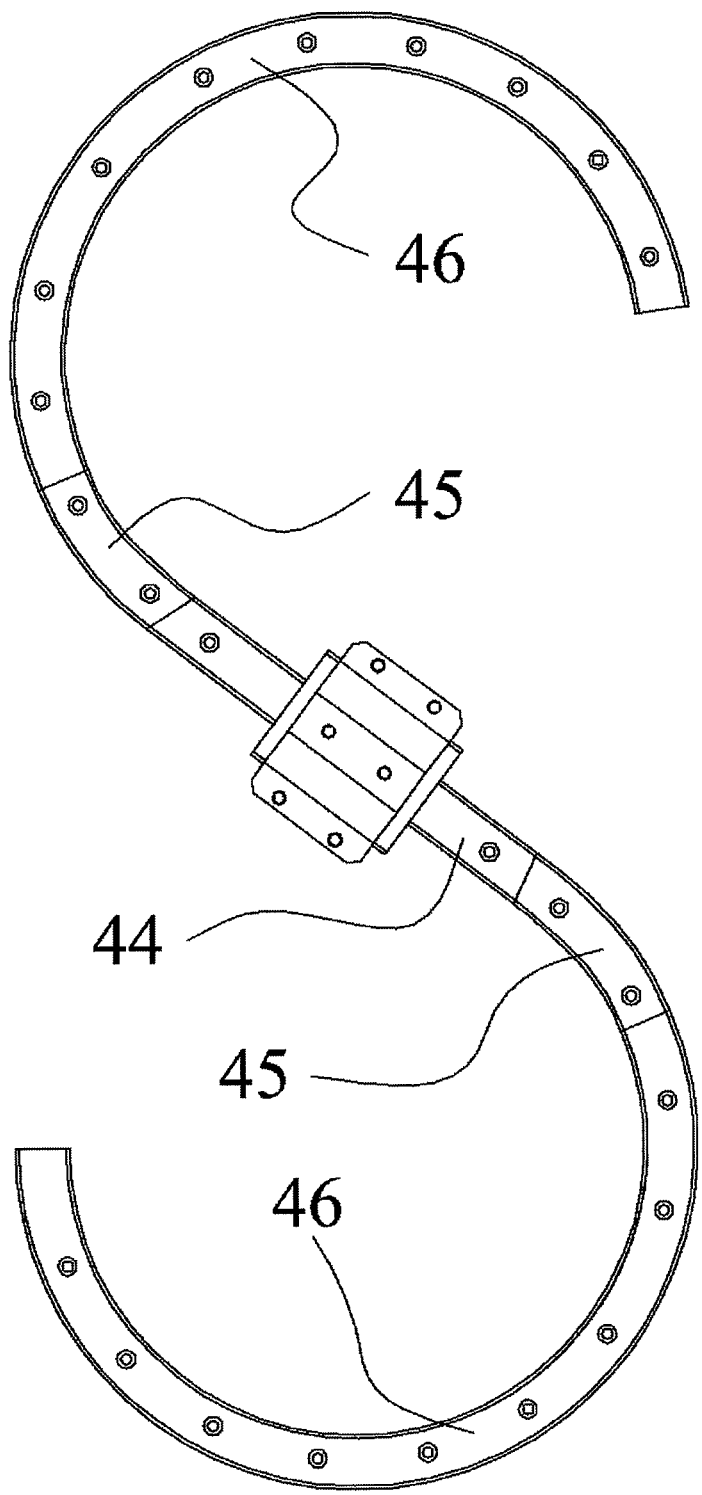
FIG. 8 illustrates a second example of application of the guiding device according to the present invention.

FIG. 8 shows alternative guiding system using a single straight track 44, two interconnecting tracks 45, and two arc tracks 46, as a track structure with open guiding path, for example, an S-type structure. It is thus understood that three kinds of track provided by the invention can be combined to form various track structure.

Figure 9:
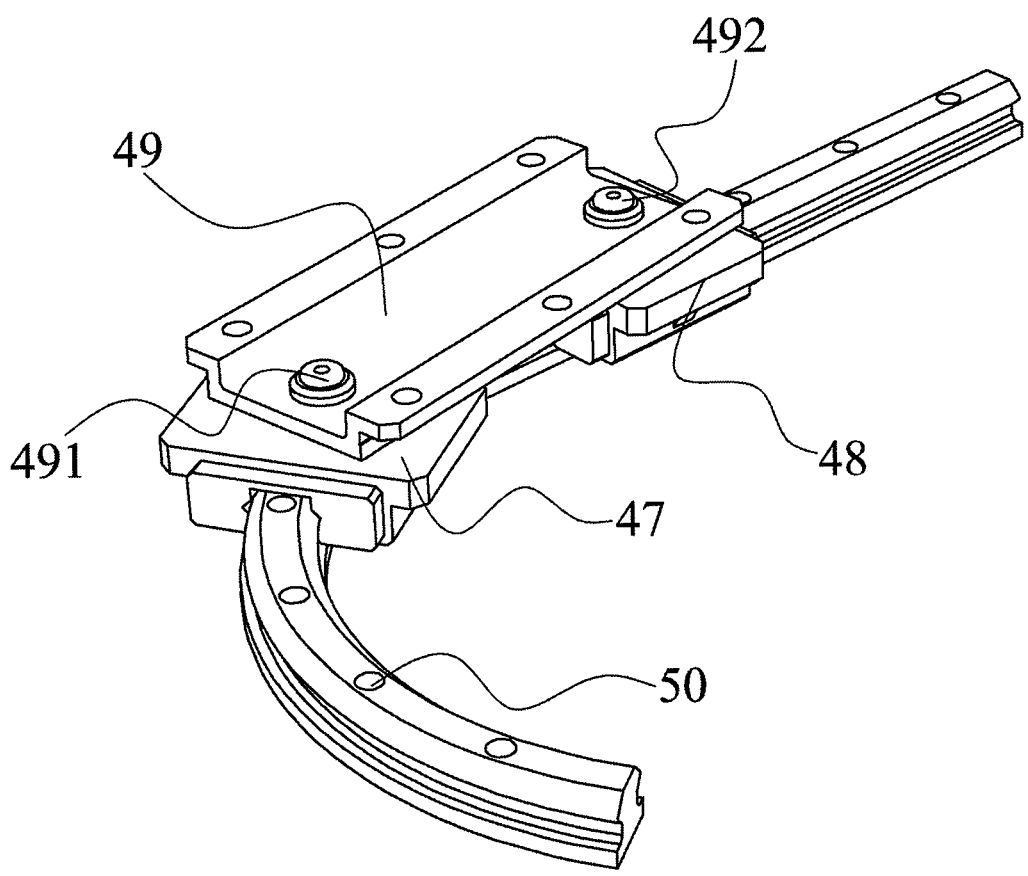
FIG. 9 illustrates a third example of application of the guiding device according to the present invention.

Referring to FIG. 9, illustrating a third example of application of the guiding device according to the present invention, as an alternative, two moving bodies 47 and 48 can be installed on a track assembly 50 and each moves through respective rolling unit.

The embodiment features that a supporting plate 49 of large area is pivoted to both of the moving bodies 47 and 48, for example, securing the plate onto the moving bodies by two joints 491 and 492 while allowing for rotation of the plate 49 relative to the moving bodies. In this way, not only single bulky article or large number of items can be conveyed easily, but overall load-carrying ability is increased. It is sure that such arrangement allows a smooth transition of the moving bodies from a straight track to an arc track.

Figure 10:
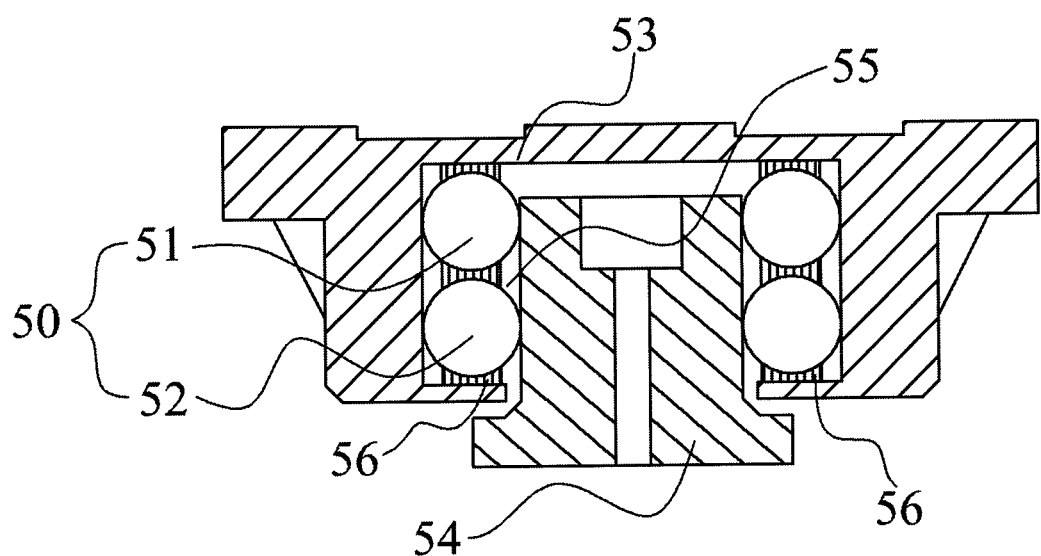
FIG. 10 is a schematic view of the guiding device with balls substituting for rollers in FIG. 4.

It is indicated here in particular that the term "a rolling member" in the invention is not to mean a single element in a limited way but to include the case of a combination of plural elements distributed along the height of the moving body, also referred to as multi "rows", the measuring unit mentioned in DESCRIPTION OF THE PRIOR ART. That is to say, the meaning of "a rolling member normally rolling on and coupling to a track" is broadly interpreted as all elements, when observed from a planar view, located at a specific position, being one or more in quantity. This is because all elements, if it is the case, travel on the same path (or profile) at any given time without motion interfering. For example, in FIG. 10 two rolling members 50 are all in the form of balls, with each member including two vertically deployed balls 51 and 52 and a retainer 56 for retaining the same. The balls are confined in an accommodating space 55 defined between a moving body 53 and a track assembly 54 and merely performs pure rolling motion without sufficient clearance to make displacement in all directions. Such guiding device has the same advantage as the first embodiment and in addition, has an improved load capacity.

What is claimed is:

1. A guiding device, comprising:
   a track assembly comprising a straight track, an interconnecting track, and an arc track, the straight track comprising a first straight contact surface and a second straight contact surface on opposite sides, the arc track comprising a first arc contact surface and a second arc contact surface on opposite sides which are concentric, the interconnecting track comprising a third arc contact surface and a variable-curvatured contact surface on opposite sides, wherein the third arc contact surface of the interconnecting track and the first arc contact surface of the arc track are the same in curvature, the third arc contact surface links the first straight contact surface and the first arc contact surface, and the variable-curvatured contact surface links the second straight contact surface and the second arc contact surface;
   a moving body spanning the track assembly; and
   a rolling unit composed of a first rolling member, a second rolling member, and a third rolling member, the first and the second rolling members normally rolling and coupling between the moving body and the track assembly on a side where the third arc contact surface is located, while the third rolling member normally rolling and coupling between the moving body and the track assembly on a side where the variable-curvatured contact surface is located;
   wherein the moving body moves along the track assembly only through the rolling unit.

2. The guiding device of claim 1, wherein the rolling members are referred to as rollers pivoted at the moving body.

3. The guiding device of claim 2, wherein each of the contact surfaces of the tracks is formed to be a horizontally-orientated cone portion and each of the rolling members is provided with an annular groove engaging with the horizontally-orientated cone portion.

4. The guiding device of claim 1, wherein the rolling members are referred to as balls restrained inside a space defined between the moving body and the track assembly and performing pure rolling motion.

5. The guiding device of claim 1, wherein a radii of the third rolling member is greater than that of the first rolling member and of the second rolling member.

6. The guiding device of claim 1, wherein each of the tracks is made of aluminum.

7. The guiding device of claim 1, wherein a radii of the first rolling member is the same with the second rolling member and a profile of the variable-curvatured contact surface is determined, according to an OXY coordinate system, as follows:

$$X_P = R_1\cos\theta - \sqrt{4\left(L\sin\frac{\eta}{2}\right)^2 - [R_1(1-\sin\theta)]^2} + L\cos\left(\phi + \frac{\pi}{2} - \frac{\eta}{2}\right) - r_2\cos\theta_C$$

$$Y_P = -R_1 + L\sin\left(\phi + \frac{\pi}{2} - \frac{\eta}{2}\right) - r_2\sin\theta_C$$

$$\phi = \tan^{-1}\left(\frac{Y_B - Y_A}{X_B - X_A}\right) = \tan^{-1}\left(\frac{R_1(1-\sin\theta)}{\sqrt{4\left(L\sin\frac{\eta}{2}\right)^2 - [R_1(1-\sin\theta)]^2}}\right)$$

$$\theta_C = \tan^{-1}\left\{\frac{-\left(R_1\cos\theta - \sqrt{4\left(L\sin\frac{\eta}{2}\right)^2 - [R_1(1-\sin\theta)]^2}\right)\tan\theta + R_1 - L\sin\left(\phi + \frac{\pi}{2} - \frac{\eta}{2}\right)}{-L\cos\left(\phi + \frac{\pi}{2} - \frac{\eta}{2}\right)}\right\}$$

where an origin of the OXY coordinate system lies on a curvature center of the arc track, an X axis and a Y axis of the OXY coordinate system are parallel with and perpendicular to the straight track respectively;

$\eta$ is an angle formed from the positive X axis to a reference line which is a straight line connecting a center of the second rolling member and the origin O of the OXY coordinate system;

$R_1$ is a sum of a curvature radii of the first arc contact surface and a radii of the first rolling member;

$r_2$ is a radii of the third rolling member;

L is a center distance between the first rolling member and the third rolling member, equaling to a center distance between the second rolling member and the third rolling member; and $\eta$ is an angle formed by a line connecting centers of the first rolling member and the third rolling member and a line connecting centers of the second rolling member and the third rolling member.

* * * * *